(12) United States Patent
Andres et al.

(10) Patent No.: US 9,327,610 B2
(45) Date of Patent: May 3, 2016

(54) METHOD FOR AUTOMATIC ENERGY DISCHARGE OF A BATTERY PACK VIA INTERNAL BATTERY ELECTRONICS POST CRASH EVENT

(75) Inventors: Peter Andres, Ginsheim-Gustavsburg (DE); Ryan M. Frakes, Bloomfield Hills, MI (US); Paul W. Kelley, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 576 days.

(21) Appl. No.: 13/612,354

(22) Filed: Sep. 12, 2012

(65) Prior Publication Data

US 2014/0070772 A1    Mar. 13, 2014

(51) Int. Cl.
| | |
|---|---|
| H02J 7/00 | (2006.01) |
| B60L 11/18 | (2006.01) |
| H01M 2/34 | (2006.01) |
| H01M 10/42 | (2006.01) |
| H01M 10/44 | (2006.01) |
| H01M 10/48 | (2006.01) |

(52) U.S. Cl.
CPC .......... B60L 11/1866 (2013.01); H01M 2/347 (2013.01); H01M 10/425 (2013.01); H01M 10/441 (2013.01); H01M 10/482 (2013.01); H02J 7/0016 (2013.01); B60L 2240/545 (2013.01); B60L 2240/547 (2013.01); B60L 2240/549 (2013.01); H01M 2010/4271 (2013.01); H01M 2200/00 (2013.01); H01M 2220/20 (2013.01); Y02T 10/7005 (2013.01); Y02T 10/7055 (2013.01); Y02T 10/7061 (2013.01)

(58) Field of Classification Search
CPC ............ Y02T 10/7005; Y02T 10/7061; Y02T 10/7055; Y02T 90/16; Y02T 10/7011; Y02T 10/7022; Y02T 10/7216; Y02T 10/7044; Y02T 10/70; Y02T 10/7077; Y02T 10/7291; Y02T 10/7016; Y02T 90/14; Y02T 90/12
USPC .................................................. 320/130–139
See application file for complete search history.

(56) References Cited

U.S. PATENT DOCUMENTS

| 8,612,073 | B2 | 12/2013 | Fuji et al. | |
|---|---|---|---|---|
| 2003/0025481 | A1* | 2/2003 | Bertness | 320/155 |
| 2006/0103351 | A1* | 5/2006 | Tanigawa et al. | 320/118 |
| 2008/0284375 | A1* | 11/2008 | Nagaoka et al. | 320/116 |
| 2012/0293129 | A1* | 11/2012 | Naghshtabrizi et al. | 320/118 |

FOREIGN PATENT DOCUMENTS

CN           101834457 A        9/2010

* cited by examiner

Primary Examiner — Binh Tat
(74) Attorney, Agent, or Firm — John A. Miller; Miller IP Group, PLC

(57) ABSTRACT

A system and method for individually discharging battery cells in a high voltage vehicle battery. The system includes a battery controller that monitors and controls the state-of-charge of each of the battery cells and a cell balancing circuit for maintaining the charge of the cells substantially equal. The controller receives a signal from a vehicle crash detector indicating that the vehicle has been in a crash, and in response instructs the cell balancing circuit to discharge all of the battery cells.

20 Claims, 2 Drawing Sheets

METHOD FOR AUTOMATIC ENERGY DISCHARGE OF A BATTERY PACK VIA INTERNAL BATTERY ELECTRONICS POST CRASH EVENT

BACKGROUND OF THE INVENTION

1. Field of the Invention

This invention relates generally to a system and method for discharging a high voltage battery on a vehicle and, more particularly, to a system and method for discharging a high voltage battery following a vehicle damaging event by automatically discharging each battery cell using a cell balancing circuit and the stored energy in the battery.

2. Discussion of the Related Art

Electric vehicles are becoming more and more prevalent. These vehicles include hybrid vehicles, such as the extended range electric vehicles (EREV), that combine a battery and a main power source, such as an internal combustion engine, fuel cell systems, etc., and electric only vehicles, such as the battery electric vehicles (BEV). These batteries can be different battery types, such as lithium-ion, nickel metal hydride, lead-acid, etc. A typical high voltage battery system for an electric vehicle may include several battery cells or modules to provide the vehicle power and energy requirements, where each battery module may include a certain number of battery cells, such as twelve cells. Different vehicle designs include different battery designs that employ various trade-offs and advantages for a particular application.

During a vehicle crash or other vehicle damaging event, the rearrangement of and/or damage to various vehicle parts and the like may cause unwanted electrical connections and the discharge of various fluids from the vehicle to occur. Because of the significant electrical power that may be stored in the vehicle battery, these things could cause potentially hazardous situations, such as electrifying of vehicle parts, chemical hazards, fire hazards, etc. The design of a vehicle battery system needs to consider these possibly harmful events.

Fault isolation detection systems are sometimes employed in electrical circuits to provide electrical fault detection. Electric vehicles are one electrical system that typically employ fault isolation detection systems to prevent a person from being harmed by high voltage on the vehicle.

In order to provide electrical fault isolation, some vehicles are equipped with a battery disconnect unit (BDU) that automatically disconnects or removes battery power from the vehicle after a crash or other event by opening battery contactors. Also, it is known in the art to employ a manual service disconnect (MSD), which is a device that separates a battery into two parts, where a trained responder responding to a vehicle crash could remove the MSD to isolate the battery. However, these known isolation techniques do not remove the charge from the battery, only contain it.

As mentioned, when a hybrid electric vehicle experiences a crash or other similar damaging event, the integrity of the vehicle battery or other rechargeable energy storage system (RESS) becomes a concern regardless of the degree of vehicle damage. It may be desirable to discharge the battery during such an event. Known battery discharge systems can be expensive, for example, thousands of dollars, and are typically heavy and require significant space. One known battery discharge system is a stand alone, embedded advanced monitoring system with DC/DC buck/boost converters including liquid cooled load banks and semi-advanced control systems. Also, compatibility between the various forms of energy storage devices in the market makes battery discharge a complicated task because of the various voltages, chemistries and current levels.

In one particular electric vehicle crash event scenario, the vehicle maybe severely damaged or "totaled" where it cannot be driven and may not be worth fixing, where the vehicle is taken to a scrap yard or other storage facility. As discussed above, if the vehicle battery still maintains significant charge, that charge may provide a potential risk for fire or other hazards. Particularly, it has been shown that during such a catastrophic vehicle crash event, short circuits in the battery circuit may cause a potential fire risk when the scraped vehicle is being stored several days and even weeks after the actual event.

When a vehicle battery is relatively new, each cell in the battery typically operates at about the same level of performance, i.e., maximum charge or capacity. However, as the battery ages over time, each cell typically degrades in performance differently than the other cells, where the performance of the battery is limited by the performance of the lowest performing cell. Further, a battery cell or battery module in the battery may fail or may otherwise be limited in performance for other reasons, such as an internal short, loss of capacity, high resistance, high temperature, etc. Therefore, electric vehicles typically include cell balancing circuits and control algorithms that control the charging of the battery so that the state-of-charge (SOC) of the battery cells is maintained about the same.

SUMMARY OF THE INVENTION

In accordance with the teachings of the present invention, a system and method are disclosed for individually discharging battery cells in a high voltage vehicle battery. The system includes a battery controller that monitors and controls the state-of-charge of each of the battery cells and a cell balancing circuit for maintaining the charge of the cells substantially equal. The controller receives a signal from a vehicle crash detector or any other battery damage detection system indicating that the vehicle has been in a crash, and in response instructs the cell balancing circuit to discharge all of the battery cells.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for automatically discharging the battery cells in a high voltage vehicle battery using battery cell balancing circuits after a vehicle crash event is merely exemplary in nature, and is in no way intended to limit the invention or its applications or uses. For example, the battery discharge technique of the present invention has particular application for discharging a high voltage vehicle battery. However, as will be appreciated by those skilled in the art, the discharge technique of the invention may have application for other battery systems other than vehicle battery systems.

The present invention proposes a battery discharge and control circuit, and corresponding method, that has particular application for automatically, slowly and separately discharging each battery cell in a high voltage battery on a vehicle after a vehicle crash or other vehicle damaging event has been detected. The battery discharge technique of the invention has particular application for those situations where the vehicle crash event is serious enough where the vehicle can no longer be driven and is sent to a scrap yard or other storage facility. The battery control circuit will automatically initiate the discharge process when the vehicle crash event is detected and will use existing battery cell balancing circuits to provide the voltage discharge or dissipation for each battery cell. Because these types of cell balancing circuits typically employ small resistors, the cell voltage discharging process will be performed slowly over time, possibly up to a couple of weeks. The battery cell discharging technique can be calibrated to a particular battery voltage, or may be controlled to discharge based on time, where the power of the battery itself is what provides the ability to continue the discharge. Because the cell voltage discharge is performed slowly over time, it is possible for a service person, or other trained individual, to stop the discharging sequence after it is initiated if it is determined that the battery is not damaged and can be salvaged, or separate battery modules can be salvaged. Thus, the discharge technique and components necessary are already existing on the vehicle and as such do not require additional elements that add size, weight, cost, etc. to the vehicle.

Figure 1:
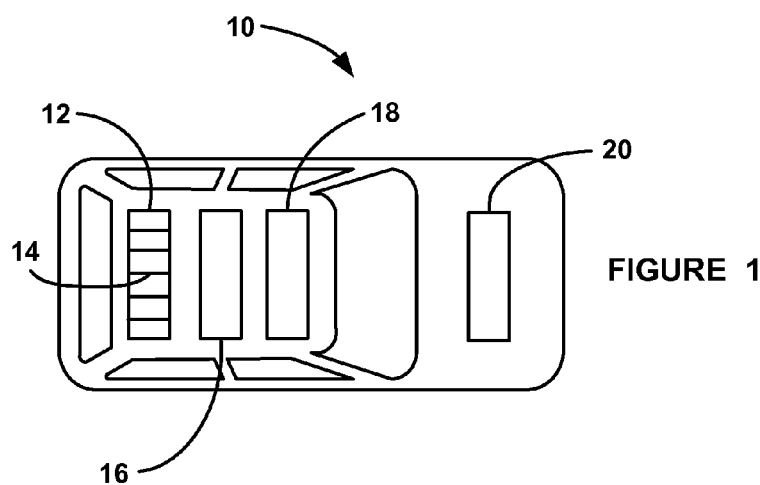
FIG. 1 is a simple illustration of a vehicle including a high voltage battery.

FIG. 1 is a simple illustration of a vehicle 10 intended to represent any electric vehicle or electric hybrid vehicle. The vehicle 10 includes a high voltage battery 12 mounted to a suitable support within the vehicle 10, where the battery 12 includes a plurality of battery cells 14. In a typical electric vehicle or electric hybrid vehicle, the vehicle battery 12 would be separated into battery modules, each including a number of battery cells, where the individual battery cells may be electrically coupled in series or parallel, and the individual battery modules may be electrically coupled in series or parallel. Further, the number of battery modules and battery cells would be dependent on the specific vehicle. For example, a battery module may include between eight and sixteen battery cells, where there may be twenty battery modules. The battery 12 can be any battery suitable for an electric vehicle, such as a lead-acid battery, lithium-ion battery, nickel metal hydride battery, etc. The vehicle 10 may also include a separate power source 16, such as an internal combustion engine, fuel cell system, etc., for an electric hybrid vehicle. The vehicle 10 also includes an electronic control unit (ECU) 18 or battery controller that controls the operation of the battery 12, including monitoring the charge and discharge, referred to herein as state-of-charge (SOC), of the battery cells 14. The vehicle 10 also includes a crash detection device 20 that can be any crash detector suitable for the purposes discussed herein, such as an airbag module, that is able to detect a vehicle crash event and send a signal to the ECU 18 to automatically initiate the battery cell discharging operation consistent with the discussion herein.

Figure 2:
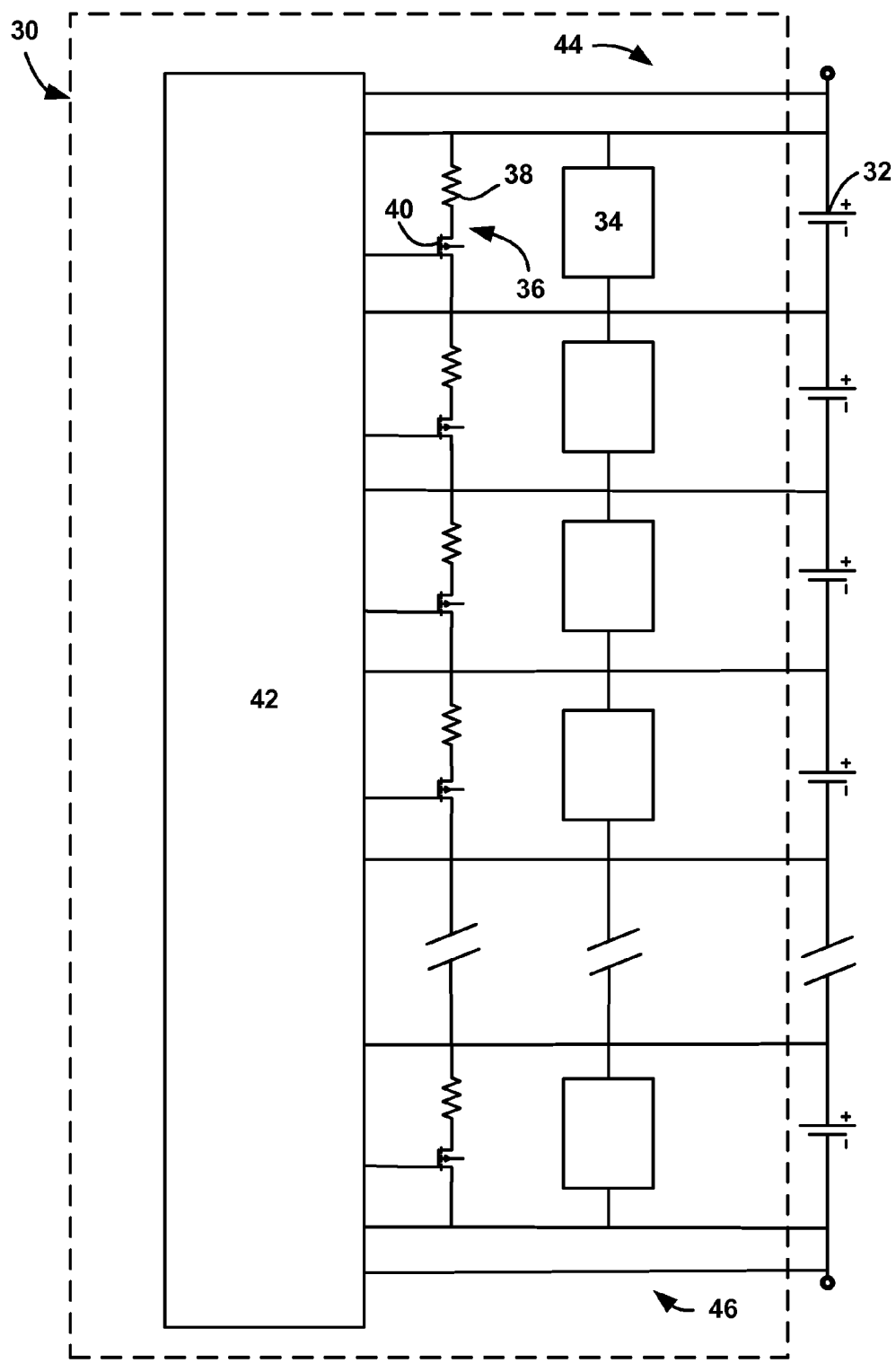
FIG. 2 is a schematic block diagram of a battery control circuit.

FIG. 2 is a schematic diagram of a battery module circuit 30 that monitors and controls a plurality of battery cells 32, representing the battery cells 14, where each battery module associated with the battery 12 would include a separate battery module circuit. FIG. 2 only shows five of the battery cells 32, where a typical battery module of this type may include twelve battery cells. The battery module circuit 30 includes a separate cell monitoring circuit 34 for each of the battery cells 32 that provides battery cell voltage detection and battery cell protection circuitry. Further, the battery module circuit 30 includes a separate cell balancing circuit 36 including a resistor 38 and a switch 40, such as a field effect transistor (FET) switch, that is capable of individually discharging the battery cell 32 for cell balancing purposes. When the switch 40 is closed, the resistor 38 is coupled across the battery cell 32 so that its voltage is dissipated through the resistor 38 to reduce its voltage to be at a level consistent with the other battery cells 32.

The battery module circuit 30 includes an integrated circuit 42, where each of the circuits 34 and 36 is electrically coupled to the integrated circuit 42. The ECU 18 provides instructions to the integrated circuit 42, and the integrated circuit 42 will include the electrical circuitry necessary to perform the commanded operations. The integrated circuit 42 includes various control components for monitoring the battery cell voltages and controlling the cell balancing, such as analog-to-digital converters. The integrated circuit 42 provides a control signal to the gate terminal of the switch 40 so that each of the cells 32 can be individually discharged. The integrated circuit 42 is self powered at terminals 44 and 46 where the power is provided by the battery cells 32. As discussed herein, once the integrated circuit 42 receives a command from the ECU 18 to discharge the battery cells 32, it will continue to operate to control the switch 40 using the power from the battery cells 32.

Figure 3:
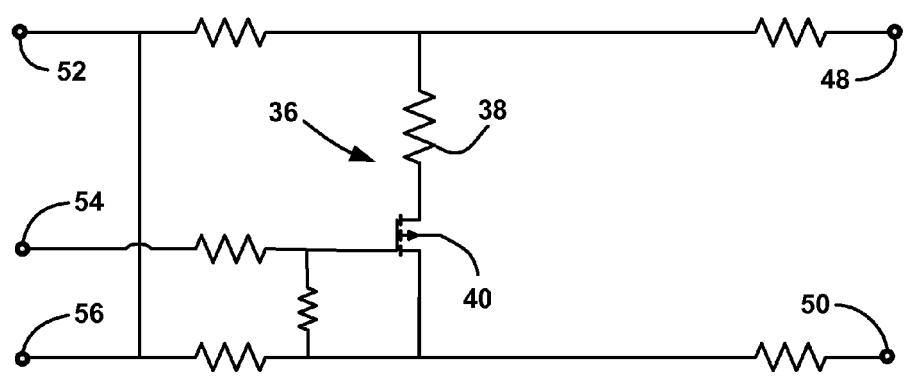
FIG. 3 is a schematic diagram of a battery balancing circuit that is part of the battery control circuit shown in FIG. 2.

Various control algorithm and circuits are known in the art that determine when to turn on the switch 40, and for how long, separately and independently for each of the battery cells 32 so that each battery cell 32 has about the same SOC during normal operation of the vehicle 10. FIG. 3 shows one non-limiting schematic diagram of the combination of the cell monitoring circuit 34 and the cell balancing circuit 36, where nodes 48 and 50 are coupled across the battery cell 32 and nodes 52, 54 and 56 are coupled to pins of the integrated circuit 42.

Each of the several battery module circuits 30 on the vehicle 10 will receive a discharge signal from the ECU 18 when the ECU 18 receives the crash detection signal from the crash detection device 20 that causes the battery module circuits 30 to begin the cell voltage discharge. As mentioned above, once the battery module circuit 30 receives the command from the ECU 18 to begin the battery cell discharging operation, the battery module circuit 30 will not require further instructions from the ECU 18 to perform that operation over the time frame discussed herein because the integrated circuit 42 is powered by the battery cells 32. For example, it is common that first responders at a vehicle crash scene will cut the battery cable to the vehicle's 12 volt battery, where the ECU 18 will not be able to operate because that is where it receives it power. However, the ECU 18 will have already commanded the battery module circuits 30 to perform the cell discharge process.

Because the ECU 18 will know the state-of-charge of the battery cells 32 as detected by the voltage monitoring circuit 34 when the crash event signal is received, not only can it provide a signal indicating that the cell discharge should commence, but also for how long it should occur to reach a desired voltage level. Further, because the voltage monitoring circuit 34 monitors the voltage of the battery cell 32, the battery module circuits 30 can be calibrated to terminate the cell discharge when it reaches a particular voltage level. The particular voltage can be a very low cell voltage where the cell 32 will be permanently damaged or a higher voltage level that is considered safe, but may not damage the battery cell 32.

Figure 4:
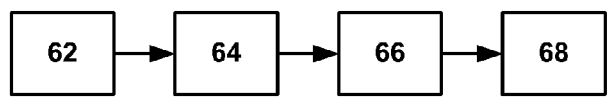
FIG. 4 is a flow chart diagram showing a process for discharging a vehicle battery.

FIG. 4 is a flow chart diagram 60 showing a process for discharging each of the battery cells 32 in the manner discussed herein. At box 62, the crash detection device 20 senses a vehicle crash or other vehicle damaging event. At box 64, the device 20 communicates the crash event to the ECU 18. At box 66, the ECU 18 sends a discharge signal to the battery module circuits 30 to begin the automatic battery cell discharge process, which takes about 10 ms. At box 68, the integrated circuit 42 will close the switch 40 to perform the cell discharge process through the resistor 38 for each of the battery cells 32 as discussed above.

The integrated circuit 42 can be programmed to discharge the battery cells 32 by controlling the switch 40 in any number of applicable scenarios. For example, the integrated circuit 42 can be programmed to provide a deep discharge of the battery cells 32 until a predetermined very low voltage limit is reached, such as 1 volt per cell 32, where the cells may be permanently damaged. Alternately, the integrated circuit 42 can be programmed to terminate the discharge of the battery cells 32 after a certain period of time has been elapsed, such as one week. The ECU 18 can instruct the integrated circuit 42 what that time should be when it provides the signal to initiate the battery discharge sequence, where the ECU 18 could base that time on the known SOC of the battery cells 32 at that particular time. Further, the integrated circuit 42 can discharge each of the battery cells 32 until an under-voltage limit is reached, which would be previously set by the ECU 18. The under-voltage limit may be some voltage that is determined to be safe, but may not be so low that the vehicle battery is damaged. Because the module circuit 30 includes the voltage detection circuit 34, the integrated circuit 42 will know when the under-voltage limit is reached. It is noted that other discharging scenarios may also be applicable.

As mentioned above, once the integrated circuit 42 is commanded to perform the discharge process, that operation will continue even if the ECU 18 becomes disconnected from the integrated circuit 42, such as by further damaging events to the vehicle 10, or being powered down from loss of vehicle battery power for any reason. Further, as mentioned, the ECU 18 can also be commanded by a trained service person to instruct the integrated circuit 42 to stop the discharging sequence for one or more of the battery module circuits 30 if it is determined that the crash is less severe than necessary to scrap the vehicle 10 or the battery 12 can be salvaged. Alternately, the service person could use a service tool to talk directly to the integrated circuit 42.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for discharging a vehicle battery having a plurality of battery cells on a vehicle in response to a vehicle damaging event, said vehicle including a battery controller that controls a state-of-charge (SOC) of each of the battery cells and a separate battery cell balancing circuit for each of the battery cells that is operable to discharge each battery cell separate from the other battery cells to balance the SOC of the battery cells, said method comprising:

detecting that the vehicle damaging event has occurred;

providing an event signal to the battery controller instructing the battery controller that the damaging event has occurred;

turning on each of the cell balancing circuits for all of the battery cells to cause the battery cells to discharge in response to the event signal, where a battery module circuit, in response to a signal from the battery controller, controls discharge of all of the battery cells contained in a battery module on the vehicle, and the battery module circuit includes the cell balancing circuit and a cell voltage monitoring circuit for each battery cell in the battery module; and controlling the discharge of the battery cells.

2. The method according to claim 1 wherein each of the cell balancing circuits includes a resistor and a switch so that when the switch is closed, the cell voltage discharges through the resistor.

3. The method according to claim 2 wherein the switch is a field effect transistor switch.

4. The method according to claim 1 wherein turning on each of the cell balancing circuits includes providing a discharge signal from the battery controller to the battery module circuit that monitors the SOC of each of the battery Cells.

5. The method according to claim 4 wherein the battery module circuit includes an integrated circuit, said integrated circuit receiving SOC signals from the cell voltage monitoring circuits and controlling the cell balancing circuits.

6. The method according to claim 4 wherein the battery module circuit is powered by the battery cells and controls the discharge of each battery cell independent of the battery controller.

7. The method according to claim 1 wherein controlling the discharge of the battery cells includes completely discharging the battery cells.

8. The method according to claim 1 wherein controlling the discharge of the battery cells includes discharging the battery cells for a predetermined period of time.

9. The method according to claim 8 wherein the predetermined period of time is based on the SOC of the battery cells when the crash signal is received.

10. The method according to claim 1 wherein controlling the discharge of the battery cells includes discharging the battery cells to a safe under-voltage limit that does not damage the battery cells.

11. A method for discharging a vehicle battery having a plurality of battery cells on a vehicle in response to a vehicle damaging event, said method comprising:

providing a vehicle damaging event detector that detects the vehicle damaging event and provides an event signal indicative of the vehicle damaging event;

providing a battery controller that controls the vehicle battery, said battery controller receiving the event signal;

providing a plurality of battery module circuits each being controlled by the battery controller and each controlling a certain number of the plurality of battery cells, each battery module circuit including an integrated circuit receiving commands from the battery controller, a cell voltage monitoring circuit for each of the battery cells for monitoring the voltage of the battery cells, and a cell balancing circuit for each of the battery cells that is operable to discharge the battery cell; and causing the integrated circuit to turn on the cell balancing circuit for each of the battery cells when the integrated circuit receives a discharge signal from the battery controller in response to the event signal.

12. The method according to claim 11 wherein each of the cell balancing circuits includes a resistor and a switch so that when the switch is closed, the cell voltage discharges through the resistor.

13. The method according to claim 11 wherein causing the integrated circuit to turn on the cell balancing circuit includes completely discharging the battery cells.

14. The method according to claim 12 wherein the switch is a field effect transistor switch.

15. The method according to claim 11 wherein causing the integrated circuit to turn on the cell balancing circuit includes discharging the battery cells for a predetermined period of time.

16. The method according to claim 15 wherein the predetermined period of time is based on the SOC of the battery cells when the crash signal is received.

17. The method according to claim 11 wherein causing the integrated circuit to turn on the cell balancing circuit includes discharging the battery cells to a safe under-voltage limit that does not damage the battery cells.

18. A battery discharge system for discharging a vehicle battery a plurality of battery cells on a vehicle in response to a vehicle damaging event, said system comprising:

a vehicle damaging event detector that detects the vehicle damaging event and provides an event signal indicative of the vehicle damaging event;

a battery controller that controls the vehicle battery and is responsive to the event signal; and a plurality of battery module circuits each being controlled by the battery controller and each controlling a certain number of the plurality of battery cells, each battery module circuit including an integrated circuit receiving commands from the battery controller, a cell voltage monitoring circuit for each of the battery cells for monitoring the voltage of the battery cells, and a cell balancing circuit for each of the battery cells that is operable to discharge the battery cell, wherein the battery controller provides a discharge signal to the integrated circuit in each of the battery module circuits that causes the integrated circuit to turn on the cell balancing circuit for each of the battery cells to discharge the cell.

19. The system according to claim 18 wherein each of the cell balancing circuits includes a resistor and a switch so that when the switch is closed, the cell voltage discharges through the resistor.

20. The system according to claim 18 wherein the battery module circuit is powered by the battery cells and controls the discharge of each battery cell independent of the battery controller.

* * * * *